(12) United States Patent
Wang et al.

(10) Patent No.: US 11,380,104 B2
(45) Date of Patent: Jul. 5, 2022

(54) METHOD AND DEVICE FOR DETECTING ILLEGAL PARKING, AND ELECTRONIC DEVICE

(71) Applicant: BEIJING BAIDU NETCOM SCIENCE AND TECHNOLOGY CO., LTD., Beijing (CN)

(72) Inventors: Guanhao Wang, Beijing (CN); Zhi Ye, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 275 days.

(21) Appl. No.: 16/798,162

(22) Filed: Feb. 21, 2020

(65) Prior Publication Data
US 2020/0364467 A1 Nov. 19, 2020

(30) Foreign Application Priority Data

May 17, 2019 (CN) .......................... 201910412569.1

(51) Int. Cl.
*G06V 20/52* (2022.01)
*G06K 9/00* (2022.01)
(Continued)

(52) U.S. Cl.
CPC ........... *G06V 20/52* (2022.01); *G06K 9/6256* (2013.01); *G06V 10/225* (2022.01);
(Continued)

(58) Field of Classification Search
None
See application file for complete search history.

(56) References Cited

U.S. PATENT DOCUMENTS

| 2018/0211117 A1* | 7/2018 | Ratti | G06K 9/00785 |
| 2019/0340783 A1* | 11/2019 | Chen | G05D 1/0088 |
| 2021/0216797 A1* | 7/2021 | Joos | G08G 1/147 |

FOREIGN PATENT DOCUMENTS

| CN | 106935035 A | 7/2017 |
| CN | 107609491 A | 1/2018 |
| CN | 107730903 A | 2/2018 |
| CN | 108216229 A | 6/2018 |

(Continued)

OTHER PUBLICATIONS

Japanese Patent Application No. 2020-083182, Office Action dated Jun. 29, 2021, 4 pages.
Japanese Patent Application No. 2020-083182, English translation of Office Action dated Jun. 29, 2021, 4 pages.

(Continued)

*Primary Examiner* — Matthew C Bella
*Assistant Examiner* — Brian D Shin
(74) *Attorney, Agent, or Firm* — Lathrop GPM LLP

(57) ABSTRACT

The present disclosure provides a method for detecting illegal parking. The method includes: obtaining a detection frame having a category of vehicle from an image acquired by an acquisition module through a first neural network to determine coordinate information of the detection frame; determining whether an area corresponding to the detection frame in the image is an illegal parking area through a second neural network; and when determining that the area is the illegal parking area, determining whether the coordinate information of the detection frame is changed within a preset period of time to determine whether the vehicle is parked illegally.

15 Claims, 5 Drawing Sheets

(51) Int. Cl.
  *G06V 10/22*   (2022.01)
  *G06K 9/62*    (2022.01)
  *G06V 20/56*   (2022.01)
(52) U.S. Cl.
  CPC ........ *G06V 20/588* (2022.01); *G06V 2201/07* (2022.01); *G06V 2201/08* (2022.01)

(56) References Cited

FOREIGN PATENT DOCUMENTS

| | | | |
|---|---|---|---|
| CN | 108509826 | A | 9/2018 |
| CN | 109255959 | A | 1/2019 |
| JP | 2002190011 | A | 7/2002 |
| JP | 2017045211 | A | 3/2017 |
| JP | 2018041176 | A | 3/2018 |
| KR | 101577747 | B1 | 12/2015 |

OTHER PUBLICATIONS

Kuwahara M. et al., "Development of parking lot full space monitoring system utilizing deep learning", Panasonic Technical Journal, Jan. 15, 2019, vol. 6 5, No. 1, 12 pages.
Chinese Patent Application No. 201910412569.1 Office Action dated Sep. 28, 2020, 11 pages.
Chinese Patent Application No. 201910412569.1 English translation of Office Action dated Sep. 28, 2020, 10 pages.
Korean Patent Application No. 10-2020-0056365, Office Action dated Oct. 9, 2021, 5 pages.
Korean Patent Application No. 10-2020-0056365, English translation of dated Oct. 9, 2021, 6 pages.

\* cited by examiner

METHOD AND DEVICE FOR DETECTING ILLEGAL PARKING, AND ELECTRONIC DEVICE

CROSS REFERENCE TO RELATED APPLICATIONS

This application claims priority and benefit to Chinese Application No. 201910412569.1, filed on May 17, 2019, the entire content of which is incorporated herein by reference.

TECHNICAL FIELD

The present disclosure relates to the field of computer technology, and more particularly, to a method and a device for detecting illegal parking, an electronic device, and a computer-readable medium.

BACKGROUND

Artificial Intelligence (AI for short) is a new technical science studying and developing theories, methods, techniques and application systems for simulating, extending and expanding human intelligence. With the rapid development of artificial intelligence, artificial intelligence plays an increasingly important role in the fields of security and smart city management.

SUMMARY

Embodiments of the present disclosure provide a method for detecting illegal parking. The method includes:

obtaining a detection frame having a category of vehicle from an image acquired by an acquisition module through a first neural network to determine coordinate information of the detection frame;

determining whether an area corresponding to the detection frame in the image is an illegal parking area through a second neural network; and when determining that the area is the illegal parking area, determining whether the coordinate information of the detection frame is changed within a preset period of time to determine whether the vehicle is parked illegally based on a judgment result.

Embodiments of the present disclosure also provide an electronic device, includes:

one or more processors; and a storage device, having one or more programs stored thereon, in which when the one or more programs are executed by the one or more processors, the one or more processors are caused to implement a method for detecting illegal parking as described above.

Embodiments of the present disclosure also provide a computer-readable medium, having a computer program stored thereon that, when executed by a processor, a method for detecting illegal parking as described above is implemented.

BRIEF DESCRIPTION OF THE DRAWINGS

The drawings are used to provide a further understanding of the embodiments of the present disclosure, and constitute a part of the specification. The drawings are used to explain the present disclosure together with the embodiments of the present disclosure rather than to limit the present disclosure.

The above and additional features and advantages become more apparent to those skilled in the art through detailed example embodiments with reference to the accompanying drawings, in which.

DETAILED DESCRIPTION

Figure 1:
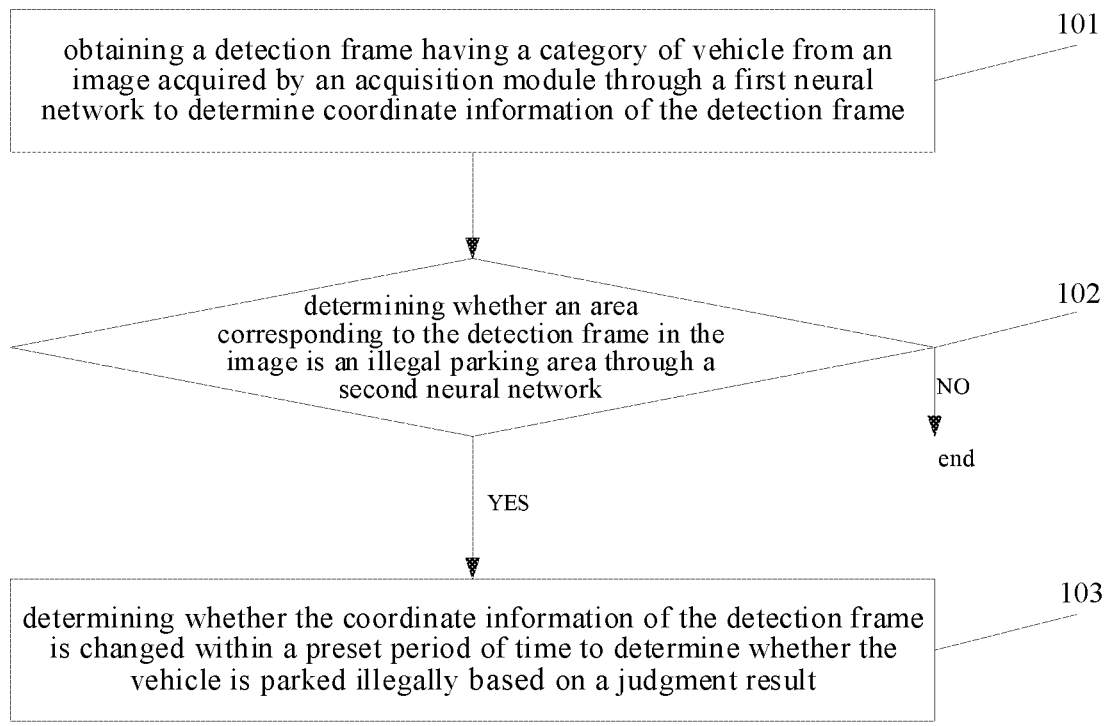
FIG. 1 is a flowchart illustrating a method for detecting illegal parking according to embodiments of the present disclosure.

In order to make those skilled in the art better understand the technical scheme of the present disclosure, a method and a device for detecting illegal parking, an electronic device, and a computer-readable medium are described in detail in combination with the attached drawings.

Example embodiments are described more fully hereinafter with reference to the accompanying drawings, but the example embodiments may be embodied in different forms and should not be construed as limited to the embodiments set forth herein. Rather, these embodiments are provided so that this disclosure will be thorough and complete, to enable those skilled in the art to fully understand the scope of this disclosure.

As used herein, the term "and/or" includes any and all combinations of one or more of the associated listed items.

The terminologies used herein are used only to describe a particular embodiment and is not intended to limit the present disclosure. As used herein, the singular forms "a" and "the" are intended to include the plural forms as well, unless the context clearly indicates otherwise. It is understood that when the terms "comprising" and/or "composed of" are used in this specification to indicate the presence of stated features, wholes, steps, operations, elements and/or components specified, which does not rule out the presence or addition of one or more other features, wholes, steps, operations, elements, components, and/or groups thereof.

Embodiments described herein may be described with reference to a plan view and/or cross-sectional view with the aid of an ideal schematic diagram of the present disclosure. Accordingly, the example illustrations may be modified according to manufacturing techniques and/or tolerances. Therefore, the embodiment is not limited to the embodiment shown in the drawings, but includes a modification of a configuration formed based on a manufacturing process.

Therefore, the regions illustrated in the drawings have schematic attributes, and the shapes of the regions illustrated in the drawings indicates the specific shapes of the regions of the elements, but are not intended to be limiting.

Unless otherwise defined, all terms (including technical and scientific terms) used herein have the same meaning as commonly understood by those skilled in the art. It is understood that terms such as those defined in commonly used dictionaries should be interpreted to have meanings consistent with their meanings in the context of the related art and the present disclosure, and will not be interpreted as having idealized or excessive formal meaning, unless explicitly defined herein.

With the rapid development of artificial intelligence, artificial intelligence gradually plays an important role in fields of security and smart city management. However, it is difficult for the urban management and law enforcement to ban illegal parking on roads. As the quality of life improves, private cars are main transportation tools for citizens, which is an important factor to be considered in urban road planning. Since the number of parking spots cannot catch up with a growth rate of private cars, illegal parking is a key object of damage to the city's appearance at this stage. Currently, the urban management department adopts patrol inspection methods, by which illegal parking is spotted during patrol inspection and then subjected to law enforcement, which is a time-consuming, costly and labor-intensive violation detection method.

Embodiments of the present disclosure provide a method for detecting illegal parking. This method mainly adopts two neural networks, that is, a first neural network and a second neural network which will be discussed below. The first neural network is configured to take image information as inputs and output a detection frame having a target category of vehicle. The second neural network is configured to take image information as inputs, perform pixel-level segmentation on the inputted image information, and output a road category corresponding to each pixel of the image.

It should be noted that before implementing the method of the present disclosure, a certain number of samples need to be collected for model training to obtain a corresponding neural network. The training of neural networks is a technique well known to those skilled in the art, which is not described in detail here.

The execution object of the method for detecting illegal parking of the present disclosure may be a device for detecting illegal parking which may be integrated in an acquisition module (such as a camera).

FIG. 1 is a flowchart illustrating a method for detecting illegal parking according to embodiments of the present disclosure.

The method for detecting illegal parking according to embodiments of the present disclosure, as illustrated in FIG. 1, may include the following.

At block 101, a detection frame having a category of vehicle is determined from an image acquired by an acquisition module through a first neural network to determine coordinate information of the detection frame.

The acquisition module may be a camera, for example, installed above traffic lights. Embodiments of the present disclosure will be illustrated in a case where the acquisition module is the camera.

In detail, the camera may input the acquired images to the first neural network one by one in frames. The first neural network may extract features of each image using the detection frame (such as a rectangle) and classifies the features of the image within the detection frame to output the detection frame having the category of the vehicle.

It should be noted here that in an actual scene of monitoring roads, since a monitoring range of the camera is wide and a large number of vehicles exists on the road, high-resolution images of 1024*640 may be used as the inputs of the first neural network to allow to accurately detect more vehicles as there are not too few vehicles in the actual scene.

The first neural network of embodiments of the present disclosure may be a multi-scale CNN (convolutional neural network). In the actual scene, with a change in the capturing distance of the camera from near to far, a scale of the vehicle detected is gradually reduced. Therefore, the multi-scale CNN may be used to extract multi-scale features of the image to achieve vehicle positioning at different scales.

A position of each pixel of the image may be indicated by a coordinate. The detection frame of the present disclosure is for framing a part of the image. Therefore, the coordinate information of the detection frame and the positions of pixels of the image are in a same coordinate system such that the coordinates of the detection frame and the positions of pixels may correspond to each other. In other words, the coordinate of a point of the detection frame may be a coordinate of the position of a pixel of the image.

At block 102, it is detected by a second neural network, whether an area corresponding to the detection frame of the image is an illegal parking area. In a case where it is determined that the detection frame indicates the illegal parking area, a block 103 is performed. In a case where it is determined that the detection frame does not correspond to the illegal parking area, the method ends at the block 102.

It should be noted that the road scene may be complicated. Before implementing the method of the present disclosure, a road category of the road may be determined. A certain number of road features may be collected as samples for training the second neural network to classify the road. For example, the road may be classified as a normal road, a blind track, a garden, a parking area or the like. The normal road refers to a road on which motor vehicles may travel. Most roads are the normal road. The blind track refers to a region marked with an obvious sign of blind track in front of buildings. The garden refers to a roadside garden of urban construction, which is an auxiliary category for determining the road category. The parking area refers to the parking area marked with white or yellow signs on the roadside.

Figure 2:
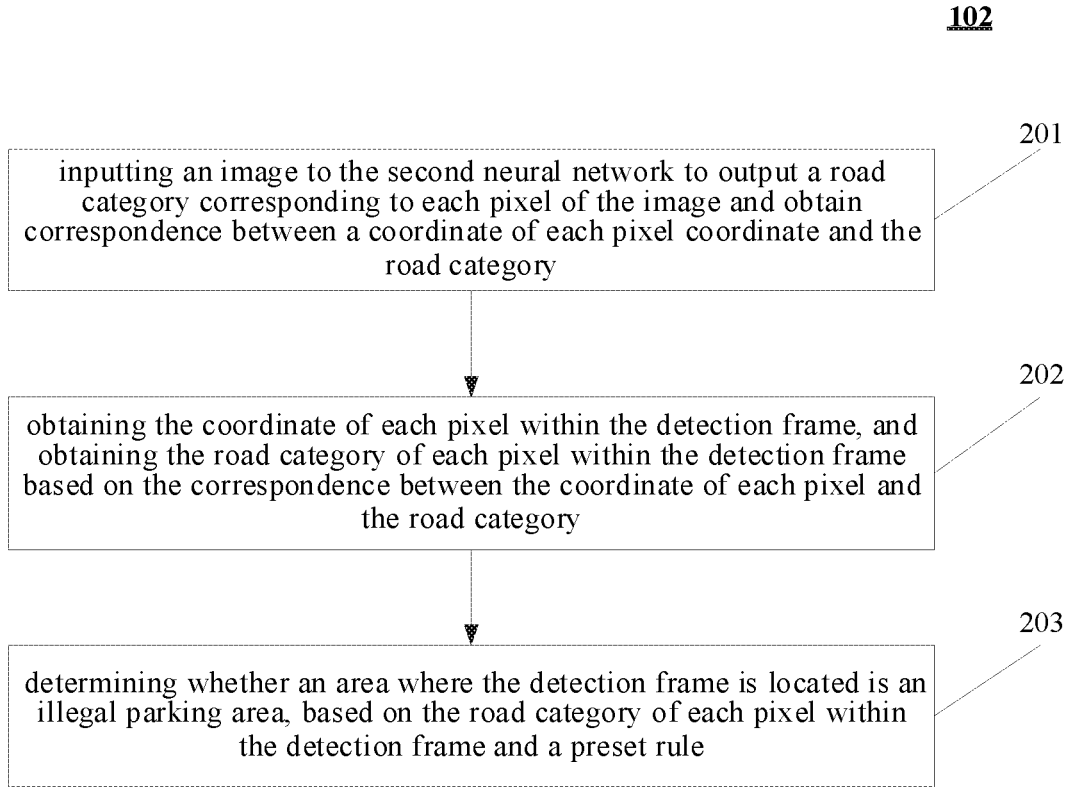
FIG. 2 is a flowchart illustrating a method for detecting illegal parking according to embodiments of the present disclosure.

FIG. 2 is a flowchart illustrating a method for detecting illegal parking according to embodiments of the present disclosure.

In some embodiments, as illustrated in FIG. 2, a possible implementation of the block 102 may include the following.

At block 201, an image acquired by the acquisition module is input to the second neural network to output a road category corresponding to each pixel of the image and to obtain a correspondence between the coordinate of each pixel and the road category.

In detail, the image acquired by the camera is used as the input of the second neural network to classify the road as one of the five categories including the normal road, the blind track, the garden, the parking area, and other, with a segmentation algorithm. The image is processed with the pixel-level segmentation to output the road category corresponding to each pixel. That is, the correspondence between the coordinate of each pixel and the road category is obtained, to achieve the pixel-level segmentation.

At block 202, the coordinate of each pixel of the image within the detection frame is obtained. The road category of each pixel within the detection frame is obtained based on the correspondence between the coordinate of each pixel and the road category obtained at block 201.

That is, the road category of each pixel of the image is obtained at block 201, and the road category of each pixel within the detection frame is obtained at block 202 based on the road category of each pixel of the image obtained at block 201.

At block 203, it is determined whether an area where the detection frame is located is an illegal parking area, based on the road category of each pixel within the detection frame and a preset rule.

Figure 3:
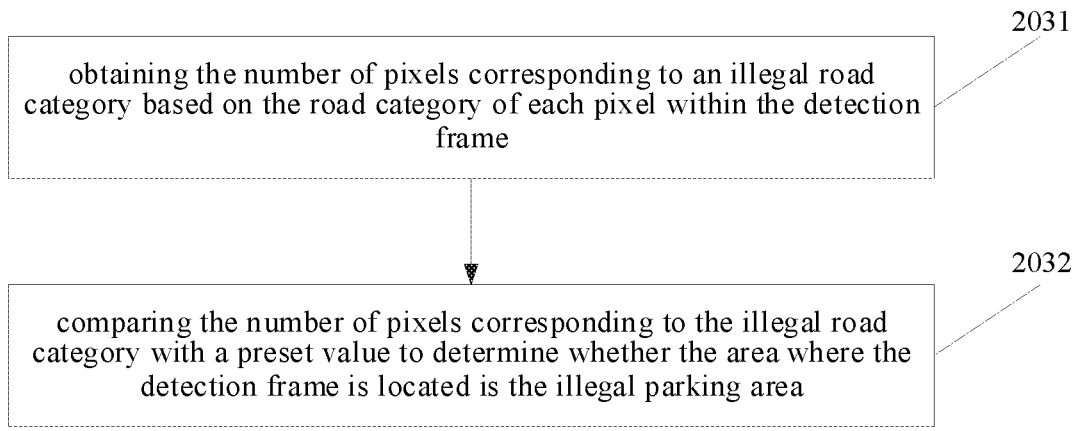
FIG. 3 is a flowchart illustrating a method for detecting illegal parking according to embodiments of the present disclosure.

FIG. 3 is a flowchart illustrating a method for detecting illegal parking according to embodiments of the present disclosure.

In some embodiments, as illustrated in FIG. 3, a possible implementation of the block 203 may include the following.

At block 2031, the number of pixels corresponding to an illegal road category is obtained based on the road category of each pixel within the detection frame.

For example, within the detection frame, the number of pixels each having the road category as the blind track (for example, the category of blind track is the illegal road category) is determined.

At block 2032, the number of pixels corresponding to the illegal road category is compared with a preset value to determine whether the area where the detection frame is located is the illegal parking area based on a comparison result.

That is, in a case where the number of pixels corresponding to the illegal road category obtained at block 2031 is greater than the preset value, it may be determined that the vehicle indicated by the detection frame is within the illegal parking area. In a case where the number of pixels corresponding to the illegal road category obtained at block 2031 is less than the preset value, it may be determined that the vehicle indicated by the detection frame is on the normal road.

Certainly, within the detection frame, the number of pixels each having the road category as the normal road category can also be determined. In this case, the above method can also be used to determine whether the vehicle is parking illegally.

Figure 4:
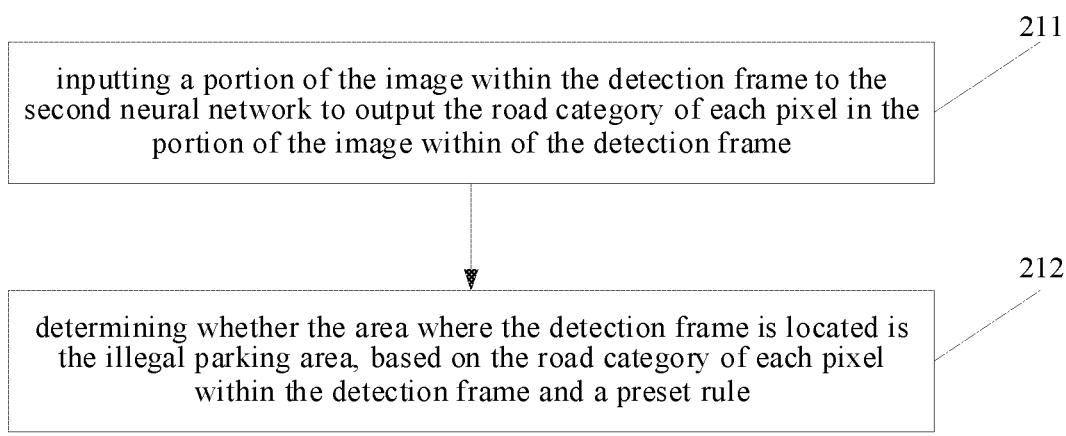
FIG. 4 is a flowchart illustrating a method for detecting illegal parking according to embodiments of the present disclosure.

FIG. 4 is a flowchart illustrating a method for detecting illegal parking according to embodiments of the present disclosure.

In some embodiments, as illustrated in FIG. 4, a possible implementation of the block 102 may include the following.

At block 211, a portion of the image within the detection frame is input to the second neural network to output a road category of each pixel in the portion of the image within the detection frame.

In detail, in block 211, a detection frame image may be obtained based on the portion of the image acquired by the camera within the detection frame. The detection frame image may be input to the second neural network for pixel-level segmentation to output the road category corresponding to each pixel within the detection frame.

At block 212, it is determined whether an area where the detection frame is located is the illegal parking area, based on the road category of each pixel within the detection frame and a preset rule.

The implementation of block 212 may be the same to that of block 203 described above, which is not limited herein again.

At block 103, it is determined whether the coordinate information of the detection frame is changed within a preset period of time. It is determined whether the vehicle is parked illegally based on a judgment result.

In detail, in some embodiments, the coordinate information of the detection frame may be preset coordinates of the detection frame, such as origin coordinates of the detection frame. In another example, the coordinate information of the detection frame may be the coordinates of four corners of a rectangular detection frame. When it is determined that the coordinates of the four corners of the detection frame are changed within the preset period of time, it may be determined that the vehicle moves. In other words, the vehicle is not maintained in the illegal parking area for a long time, and thus the vehicle is not parking illegally. In a case where the coordinates of the four corners of the detection frame are not changed within the preset period of time, it may be determined that the vehicle is parked or is not moved, and thus it is determined that the vehicle is parking illegally.

With the method for detecting illegal parking according to embodiments of the present disclosure, the images acquired by the acquisition module are used as inputs. The detection frame having the category of vehicle is determined through the first neural network to position the vehicle and the second neural network is used to classify the road at a pixel level to accurately position the road where the vehicle is located, and determine whether the coordinate information of the detection frame is changed within the preset period of time to achieve accurate determination on illegal parking of the vehicle. In this case, the detection of illegal parking is efficient, and the human resources and material assets may be greatly reduced.

Figure 5:
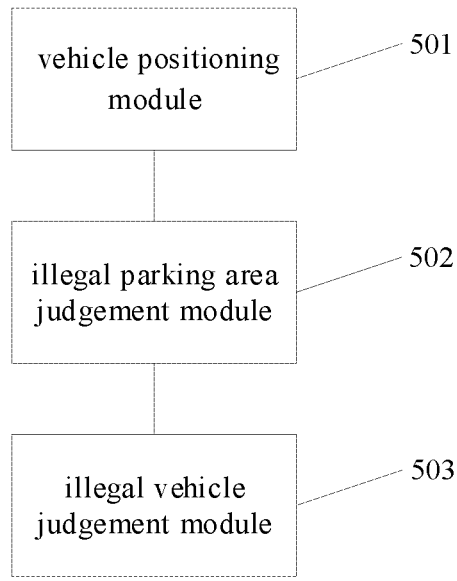
FIG. 5 is a block diagram illustrating a device for detecting illegal parking according to embodiments of the present disclosure.

FIG. 5 is a block diagram illustrating a device for detecting illegal parking according to embodiments of the present disclosure.

The device for detecting illegal parking according to embodiments of the present disclosure, as illustrated in FIG. 5 may include a vehicle positioning module 501, an illegal parking area judgement module 502 and an illegal vehicle judgement module 503.

The vehicle positioning module 501 is configured to obtain a detection frame having a category of vehicle from an image acquired by an acquisition module through a first neural network to determine coordinate information of the detection frame. The illegal parking area judgement module 502 is configured to determine by a second neural network whether an area corresponding to the detection frame of the image is an illegal parking area. The illegal vehicle judgement module 503 is configured to determine whether the coordinate information of the detection frame is changed within a preset period of time in response to detecting that the area is the illegal parking area, and determine whether the vehicle is parked illegally based on a judgment result.

With the device for detecting illegal parking according to embodiments of the present disclosure, the images acquired by the acquisition module are used as inputs. The detection frame having the category of vehicle is determined through the first neural network to position the vehicle, and the second neural network is used to classify the road at a pixel level to accurately position the road where the vehicle is located, and determine whether the coordinate information of the detection frame is changed within the preset period of time to achieve accurate determination on illegal parking of the vehicle. In this case, the detection of illegal parking is efficient, and the human resources and material assets may be greatly reduced.

It should be noted that the vehicle positioning module 501 may be configured to implement the block 101. The illegal parking area judgement module 502 may be configured to implement the block 102. The illegal vehicle judgement module 503 may be configured to implement the block 103.

Figure 6:
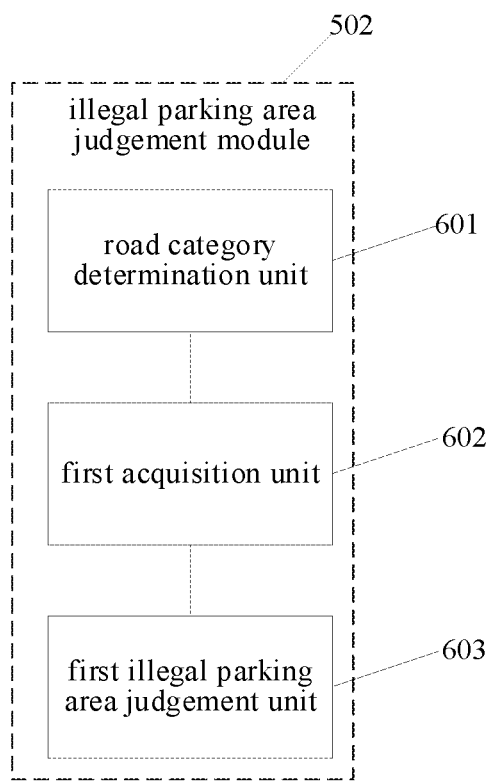
FIG. 6 is a block diagram illustrating a device for detecting illegal parking according to embodiments of the present disclosure.

FIG. 6 is a block diagram illustrating a device for detecting illegal parking according to embodiments of the present disclosure.

The illegal parking area judgement module 502, as illustrated in FIG. 6, may include a road category determination unit 601, a first acquisition unit 602 and a first illegal parking area judgement unit 603.

The road category determination unit 601 is configured to input an image acquired by the acquisition module to the second neural network to output a road category corresponding to each pixel of the image and obtain a correspondence between a coordinate of each pixel and the road category. The first acquisition unit 602 is configured to obtain the coordinate of each pixel of the image within the detection frame and obtain the road category of each pixel within the detection frame based on the correspondence between the coordinate of each pixel and the road category. The first illegal parking area judgement unit 603 is configured to determine whether an area where the detection frame is located is an illegal parking area, based on the road category of each pixel within the detection frame and a preset rule.

It should be noted that the road category determination unit 601 may be configured to implement the block 201. The first acquisition unit 602 may be configured to implement the block 202. The first illegal parking area judgement unit 603 may be configured to implement the block 203.

Figure 7:
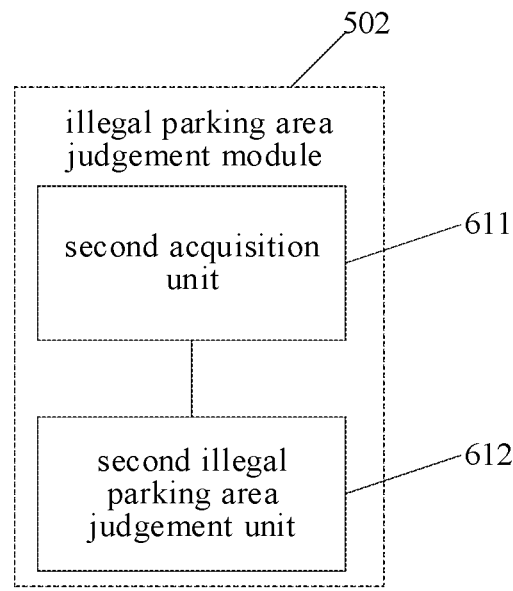
FIG. 7 is a block diagram illustrating a device for detecting illegal parking according to embodiments of the present disclosure.

FIG. 7 is a block diagram illustrating a device for detecting illegal parking according to embodiments of the present disclosure.

The illegal parking area judgement module 502, as illustrated in FIG. 6, may include a second acquisition unit 611 and a second illegal parking area judgement unit 612.

The second acquisition unit 611 is configured to input a portion of the image within the detection frame to the second neural network to output a road category of each pixel in the portion of the image within the detection frame. The second illegal parking area judgement unit 612 is configured to determine whether an area where the detection frame is located is an illegal parking area, based on the road category of each pixel within the detection frame and a preset rule.

It should be noted that the second acquisition unit 611 may be configured to implement the block 212. The second illegal parking area judgement unit 612 may be configured to implement the block 213.

Figure 8:
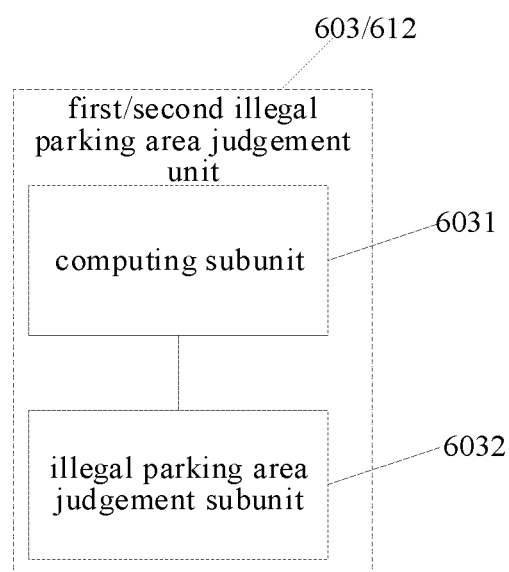
FIG. 8 is a block diagram illustrating a device for detecting illegal parking according to embodiments of the present disclosure.

FIG. 8 is a block diagram illustrating a device for detecting illegal parking according to embodiments of the present disclosure.

The first illegal parking area judgement unit 603 and the second illegal parking area judgement unit 11, as illustrated in FIG. 8, includes a computing subunit 6031 and an illegal parking area judgement subunit 6032.

The computing subunit 6031 is configured to obtain the number of pixels corresponding to an illegal road category based on the road category of each pixel in the detection frame.

The illegal parking area judgement subunit 6032 is configured to compare the number of pixels corresponding to the illegal road category with a preset value to determine whether the area where the detection frame is located is the illegal parking area based on a comparison result.

It should be noted that the computing subunit 6031 may be configured to implement the block 2031. The illegal parking area judgement subunit 6032 may be configured to implement the block 2032.

Figure 9:
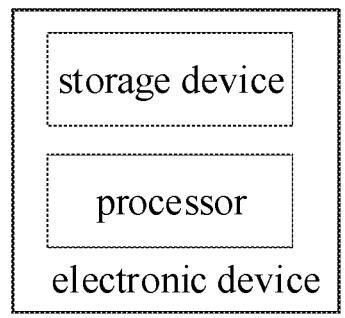
FIG. 9 is a block diagram illustrating an electronic device according to embodiments of the present disclosure.

FIG. 9 is a block diagram illustrating an electronic device according to embodiments of the present disclosure. As illustrated in FIG. 9, the electronic device includes one or more processors; and a storage device having one or more programs stored thereon. When the one or more programs are executed by the one or more processors, the one or more processors are caused to implement the method for detecting illegal parking as described above.

Embodiments of the present disclosure provide a computer-readable medium, having a computer program stored thereon. When the computer program is executed by a processor, the method for detecting illegal parking as described above is implemented.

Those of ordinary skill in the art can understand that all or some steps, systems, and functional modules/units in the methods disclosed above can be implemented as software, firmware, hardware, and appropriate combinations thereof. In a hardware implementation, the division between functional modules/units mentioned in the above description does not necessarily correspond to the division of physical components. For example, one physical component may have multiple functions, or one function or step may be executed cooperatively by several physical components. Some or all physical components can be implemented as software executed by a processor, such as a central processing unit, a digital signal processor, and a microprocessor, as hardware, or as an integrated circuit, such as a dedicated integrated circuit. Such software may be distributed on a computer-readable media, which may include computer storage medias (or non-transitory media) and communication medias (or transitory media). As is known to those of ordinary skill in the art, the term computer storage medium includes volatile and non-volatile, removable and non-removable media implemented in any method or technology used to store information such as computer-readable instructions, data structures, program modules or other data. Computer storage media includes, but is not limited to, RAM, ROM, EEPROM, flash memory or other memory technologies, CD-ROM, digital versatile disk (DVD) or other optical disk storage, magnetic cartridges, magnetic tape, disk storage or other magnetic storage devices, or any other medium used to store desired information and can be accessed by a computer. In addition, it is well known to those of ordinary skill in the art that a communication medium typically contains computer-readable instructions, data structures, program modules, or other data in a modulated data signal such as a carrier wave or other transmission mechanism, and may include any information delivery medium.

Example embodiments have been disclosed herein, and although specific terminologies are employed, they are used only and should only be interpreted as a general illustrative meaning, and not for limiting purposes. In some instances, it will be apparent to those skilled in the art that features, characteristics and/or elements described in combination with a particular embodiment may be used alone, or in combination with additional features, characteristics and/or elements described in other embodiments. Therefore, it is understood by those skilled in the art that various changes in form and details may be made without departing from the scope of the present disclosure as set forth in the appended claims.

What is claimed is:

1. A method for detecting illegal parking, comprising:
obtaining a detection frame having a category of vehicle from an image through a first neural network to determine coordinate information of the detection frame;

determining whether an area corresponding to the detection frame in the image is an illegal parking area through a second neural network; and in response to determining that the area is the illegal parking area, determining whether the coordinate information of the detection frame is changed within a preset period of time to determine whether the vehicle is parked illegally;

wherein determining whether the area corresponding to the detection frame in the image is the illegal parking area through the second neural network, comprises:

inputting the image to the second neural network to output a road category corresponding to each pixel of the image and obtain a correspondence between a coordinate of each pixel and the road category;

obtaining the coordinate of each pixel of the image within the detection frame, and obtaining the road category of each pixel within the detection frame based on the correspondence between the coordinate of each pixel and the road category; and determining whether the area corresponding to the detection frame is the illegal parking area, based on the road category of each pixel within the detection frame and a preset rule.

2. The method of claim 1, wherein inputting the image to the second neural network and determining whether the area corresponding to the detection frame is the illegal parking area comprises:

inputting a portion of the image within the detection frame to the second neural network to output a corresponding road category of each pixel in the portion of the image within the detection frame; and determining whether the area corresponding to the detection frame is the illegal parking area, based on the road category of each pixel within the detection frame and the preset rule.

3. The method of claim 2, wherein determining whether the area corresponding to the detection frame is the illegal parking area, based on the road category of each pixel within the detection frame and the preset rule, comprises:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

4. The method of claim 1, wherein determining whether the area corresponding to the detection frame is the illegal parking area, based on the road category of each pixel within the detection frame and the preset rule, comprises:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

5. A non-transitory computer-readable medium, having a computer program stored thereon that, when executed by a processor, a method for detecting illegal parking implemented, the method comprising:

obtaining a detection frame having a category of vehicle from an image through a first neural network to determine coordinate information of the detection frame;

determining whether an area corresponding to the detection frame in the image is an illegal parking area through a second neural network; and in response to determining that the area is the illegal parking area, determining whether the coordinate information of the detection frame is changed within a preset period of time to determine whether the vehicle is parked illegally;

wherein determining whether the area corresponding to the detection frame in the image is the illegal parking area through the second neural network, comprises:

inputting the image to the second neural network to output a road category corresponding to each pixel of the image and obtain a correspondence between a coordinate of each pixel and the road category;

obtaining the coordinate of each pixel of the image within the detection frame, and obtaining the road category of each pixel within the detection frame based on the correspondence between the coordinate of each pixel and the road category; and determining whether the area corresponding to the detection frame is the illegal parking area, based on the road category of each pixel within the detection frame and a preset rule.

6. The method of claim 1, wherein the coordinate information of the detection frame comprises four corner coordinates of the detection frame.

7. An electronic device, comprising:

one or more processors; and a storage device, having one or more programs stored thereon, wherein when the one or more programs are executed by the one or more processors, the one or more processors are configured to:

obtain a detection frame having a category of vehicle from an image through a first neural network to determine coordinate information of the detection frame;

determine whether an area corresponding to the detection frame in the image is an illegal parking area through a second neural network; and in response to determining that the area is the illegal parking area, determine whether the coordinate information of the detection frame is changed within a preset period of time to determine whether the vehicle is parked illegally;

wherein the one or more processors are configured to determine whether the area corresponding to the detection frame in the image is the illegal parking area through the second neural network by:

inputting the image to the second neural network to output a road category corresponding to each pixel of the image and obtain a correspondence between a coordinate of each pixel and the road category;

obtaining the coordinate of each pixel of the image within the detection frame, and obtaining the road category of each pixel within the detection frame based on the correspondence between the coordinate of each pixel and the road category; and determining whether the area corresponding to the detection frame is the illegal parking area, based on the road category of each pixel within the detection frame and a preset rule.

8. The device of claim 7, wherein the one or more processors are configured to input the image to the second neural network and determine whether the area corresponding to the detection frame is the illegal parking area by:

inputting a portion of the image within the detection frame to the second neural network to output a corresponding road category of each pixel in the portion of the image within the detection frame; and determining whether the area corresponding to the detection frame is the illegal parking area, based on the road category of each pixel within the detection frame and a preset rule.

9. The device of claim 8, wherein the one or more processors are configured to determine whether the area corresponding to the detection frame is the illegal parking area, based on the road category of each pixel within the detection frame and the preset rule by:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

10. The device of claim 7, wherein the one or more processors are configured to determine whether the area corresponding to the detection frame is the illegal parking area, based on the road category of each pixel within the detection frame and the preset rule by:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

11. The device of claim 7, wherein the coordinate information of the detection frame comprises four corner coordinates of the detection frame.

12. The non-transitory computer-readable medium of claim 5, wherein determining whether the area corresponding to the detection frame is the illegal parking area, based on the road category of each pixel within the detection frame and the preset rule, comprises:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

13. The non-transitory computer-readable medium of claim 5, wherein inputting the image to the second neural network and determining whether the area corresponding to the detection frame is the illegal parking area comprises:

inputting a portion of the image within the detection frame to the second neural network to output a corresponding road category of each pixel in the portion of the image within the detection frame; and determining whether the area corresponding to the detection frame is the illegal parking area, based on the road category of each pixel within the detection frame and a preset rule.

14. The non-transitory computer-readable medium of claim 13, wherein determining whether the area corresponding to the detection frame is the illegal parking area, based on the road category of each pixel within the detection frame and the preset rule, comprises:

obtaining the number of pixels corresponding to an illegal road category based on the road category of each pixel within the detection frame; and comparing the number of pixels corresponding to the illegal road category with a preset value, to determine whether the area where the detection frame is located is the illegal parking area.

15. The non-transitory computer-readable medium of claim 5, wherein the coordinate information of the detection frame comprises four corner coordinates of the detection frame.

* * * * *